(12) United States Patent
Ahimovic et al.

(10) Patent No.: US 6,209,021 B1
(45) Date of Patent: Mar. 27, 2001

(54) SYSTEM FOR COMPUTER SUPPORTED COLLABORATION

(75) Inventors: Peter Ahimovic, Bradley Beach, NJ (US); Narayan Manepally, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1204 days.

(21) Appl. No.: 08/541,471

(22) Filed: Oct. 10, 1995

Related U.S. Application Data

(63) Continuation of application No. 08/047,121, filed on Apr. 13, 1993, now abandoned.

(51) Int. Cl.[7] .................. G06F 15/16; H04J 3/06
(52) U.S. Cl. .................. 709/204; 370/260; 370/265; 370/537
(58) Field of Search .................. 345/1–2, 115, 345/163, 168; 370/62, 260, 265, 537; 395/153, 200.04, 887, 893, 800, 329–332; 709/204, 231, 246

(56) References Cited

U.S. PATENT DOCUMENTS

| | | | | |
|---|---|---|---|---|
| 4,414,621 | * | 11/1983 | Bown et al. ............ | 395/153 |
| 4,710,917 | * | 12/1987 | Tompkins et al. ....... | 370/62 |
| 4,742,544 | * | 5/1988 | Kupnicki et al. ....... | 380/19 |
| 4,939,509 | * | 7/1990 | Bartholomew et al. ... | 340/717 |
| 4,953,159 | * | 8/1990 | Hayden et al. ......... | 370/62 |
| 4,974,173 | * | 11/1990 | Stefik et al. ......... | 395/153 |
| 5,008,853 | * | 4/1991 | Bly et al. ............ | 395/153 |
| 5,014,267 | * | 5/1991 | Tompkins et al. ....... | 370/62 |
| 5,119,319 | * | 6/1992 | Tanenbaum ............ | 364/514 |
| 5,195,086 | * | 3/1993 | Baumgartner et al. ... | 370/62 |
| 5,202,759 | * | 4/1993 | Laycock .............. | 348/152 |
| 5,208,912 | | 5/1993 | Nakayama et al. ...... | 395/200 |
| 5,239,373 | * | 8/1993 | Tang et al. ........... | 348/14 |
| 5,280,583 | * | 1/1994 | Nakayama et al. ...... | 395/200 |
| 5,293,619 | * | 3/1994 | Dean ................. | 395/650 |
| 5,301,268 | * | 4/1994 | Takeda ............... | 395/157 |
| 5,313,581 | * | 5/1994 | Giokas et al. ......... | 395/200 |
| 5,337,407 | * | 8/1994 | Bates et al. .......... | 395/153 |
| 5,355,299 | * | 10/1994 | Arano et al. .......... | 386/104 |
| 5,392,165 | * | 2/1995 | Hosono et al. ......... | 386/92 |
| 5,499,106 | * | 3/1996 | Arano et al. .......... | 386/104 |

OTHER PUBLICATIONS

Sigois Bulletin—1990 Conference on Office Information Systems, vol. 11, No. 2–3, Apr. 1990, Cambridge USA pp. 238–248, S.R. Ahuja, J.R. Ensor, and S.E. Lucco, "A Comparison of Application Sharing Mechanisms in Real–Time Desktop Conferencing Systems".

(List continued on next page.)

Primary Examiner—Mark Rinehart
Assistant Examiner—Marc D. Thompson
(74) Attorney, Agent, or Firm—Duane, Morris & Heckscher LLP

(57) ABSTRACT

A system for computer supported collaboration is provided wherein two applications, having individual input devices, are coupled to a network which transmits application data between the two applications. Each application is capable of processing its own application data and the application data of the application at the remote end of the network simultaneously.

23 Claims, 5 Drawing Sheets

OTHER PUBLICATIONS

Communications of the Association for Computing Machinery, vol. 34, No. 1, Jan. 1991, New York, US pp. 38–58, XP000207752, C.A. Ellis, S.J. Gibbs, and G.L. Rein, "Groupware: Some Issue and Experiences".

Proceedings of the 4th Annual Symposium on User Interface Software and Technology (UIST), Nov. 1991, Hilton Head, US pp. 79–86, XP000315069, E.A. Bier and S. Freeman, "MMM: A User Interface Architecture for Shared Editors on a Single Screen".

Proceedings of the 2nd IEEE Conference on Computer Workstations, Mar. 1988, Santa Clara, US, pp. 52–58, J.R. Ensor, S.R. Ahuja, D.N. Horn, and S.E. Lucco, "The Rapport Multimedia Conferencing System—A Software Overview".

Chang, E, et al. "Group Coordination in Participant Systems." System Sciences, Annual Hawaii Int'l Conference, 1991, pp. 589–599.*

Cobbley, D. "Multipoint LAN Conferencing" in Digest of Papers. Compcon Spring '93', pp. 502–506.*

Macedoma, M. et al., "MBone Provides Audio and Video Across The Internet", IEEE Computer, (Apr. 1994) pp. 30–36.* de Moraes et al., "The Internet Multicast From ITS . . . " IEEE Communications Magazine (Jan. 1995) pp. 6–8.*

* cited by examiner

SYSTEM FOR COMPUTER SUPPORTED COLLABORATION

This application is a continuation of copending application(s) Ser. No. 08/047,121 filed on Apr. 13, 1993 now abandoned.

BACKGROUND OF THE INVENTION

1. Field of the Invention

This invention relates to the field of video processing and, in particular, to the processing of video audio and data signals which are transmitted between computers.

2. Background Art

Video conferencing networks may be isochronous networks having a fixed bandwidth and a fixed delay. This permits transmitted video compressed at one end of a video conferencing network to arrive at theremote end of the network in a fixed fashion so that it can be smoothly decompressed and displayed. This also prevent a choppy reproduction.

The problems caused by choppy video reproduction may not be very noticeable. However, when audio reproduction is choppy the results are unsatisfactory. The only isochronous network available at this time for avoiding this problem is the telephone system.

SUMMARY OF THE INVENTION

The computer supported collaboration system of the present invention includes both video and audio data communications. The communication of video and audio data are simultaneous with the sharing of application programs, and their application program data, by way of a connection between computers. The connection between computers may be implemented in a number of ways. For example, the public telephone network may provide a connection between computers which are located in different locations, in a single country, or in locations in different countries. However, the inventive system is not limited to connections by way of public telephone networks. For example the connection may be a dedicated data connection between the computers.

A video conference application program allows an initiating user to select a remote computer using the name of the destination user or using a corresponding identifier such as the telephone number of the destination user. A video conference may then be established with the destination user. The application program of the initiating user places a call to the selected remote computer. This may be performed using a CALL button that, when pressed, presents the initiating user with a listing of names and identifiers. If the remote computer is also running the video conference application program the initiating application program begins the video conference by transmitting compressed interleaved audio and video frames to the remote computer by way of the data connection. The remote computer also starts transmitting compressed interleaved audio and video frames. When each of the computers receives data the compressed data is decompressed and displayed or heard in the case of audio.

Images of the users of the computer supported collaboration system may be displayed in a small window on their own displays in addition to being displayed at the other end of the system. This permits users to determine that the image received by the remote user is suitable for display. The remote user is preferably displayed in a larger window on each display in order to keep the focus of the users on the remote users. A HANGUP button may also be provided for use when a video conference is in progress. This permits termination of the video conference.

The sharing of application programs between the remote terminals and the sharing of their data in the computer supported collaboration system of the present invention may be performed using various data sharing embodiments. A very general data sharing embodiment is an embodiment wherein mouse drivers and keyboard drivers are provided in order to: (1) send data from both the mouse and the keyboard to the remote computer operating system on the remote side of the network, as well as (2) send data to the operating system of the local computer. This embodiment permits any application program to be shared across the network even if it was not originally designed to be shared.

An alternate data sharing embodiment is one wherein an application program is written in a manner which adapts it for data sharing during a video conference. In this data sharing embodiment each application program transmits its data to the remote application program in an appropriate manner. A further data sharing embodiment is one wherein the operating system of each of the computers allows application programs to cut and/or copy data into a respective clipboard which is effectively shared by the two computers. The shared clipboard of each computer transmits this data to the shared clipboard of the remote computer. This permits any application which provides cut and/or copy capability to be shared using the computer supported collaboration system of the present invention.

DETAILED DESCRIPTION OF THE INVENTION

Figure 1:
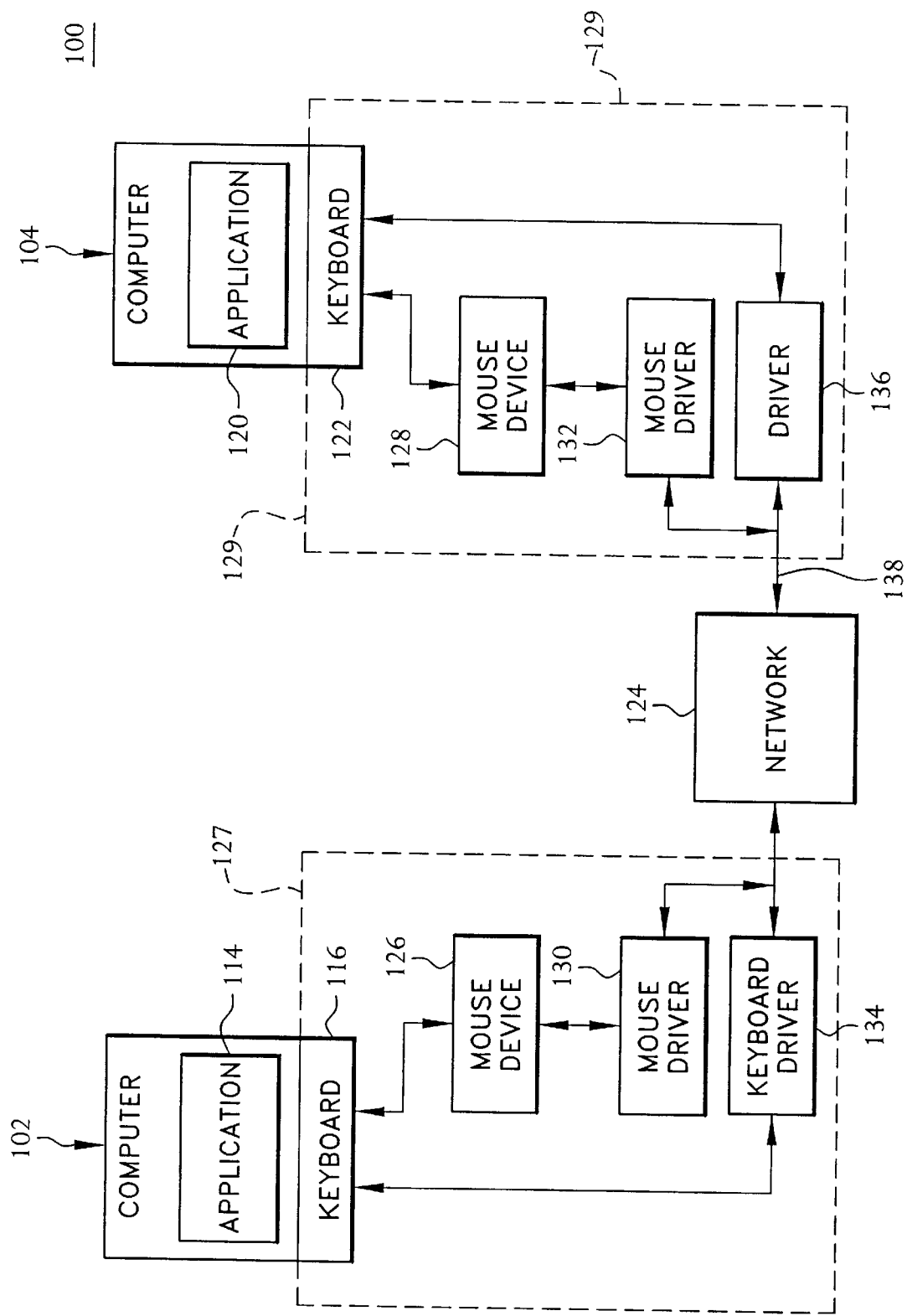
FIG. 1 shows a block diagram representation of the computer supported collaboration system of the present invention.

Referring now to FIG. 1, there is shown video conferencing system 100 wherein application programs 114, 120 run simultaneously on personal computers 102, 104 and communicate with each other. The communication between personal computers 102, 104, executing application programs 114, 120, is by way of video conferencing network 124. In this embodiment of the present invention a video teleconference is supported between personal computers 102, 104 wherein the video images and the audio signals generated at the end of video conferencing system 100 where personal computer 102 is disposed are captured in computer 102. The captured signals in personal computer 102 are transmitted by way of video conferencing network 124 to personal computer 104. At personal computer 104 the video captured by personal computer 102 is displayed and the audio is played out.

Depending on the type of data sharing implemented on video conferencing system 100 application programs 114, 120 may be designed for data sharing with a number of users or they may be completely independent of any previous data sharing capability. For example, applications programs 114, 120 may be Microsoft (Excel). Using video conferencing system 100 application programs 114, 120 operating upon personal computers 102, 104 may share network resources. In conferencing system 100 the audio data streams as well as the video data streams of personal computers 102, 104 are multiplexed over bidirectional data transmission line 138. The operations and functions of application collaboration drivers 127, 129 are described herein below for a variety of date sharing embodiments.

Figure 2:
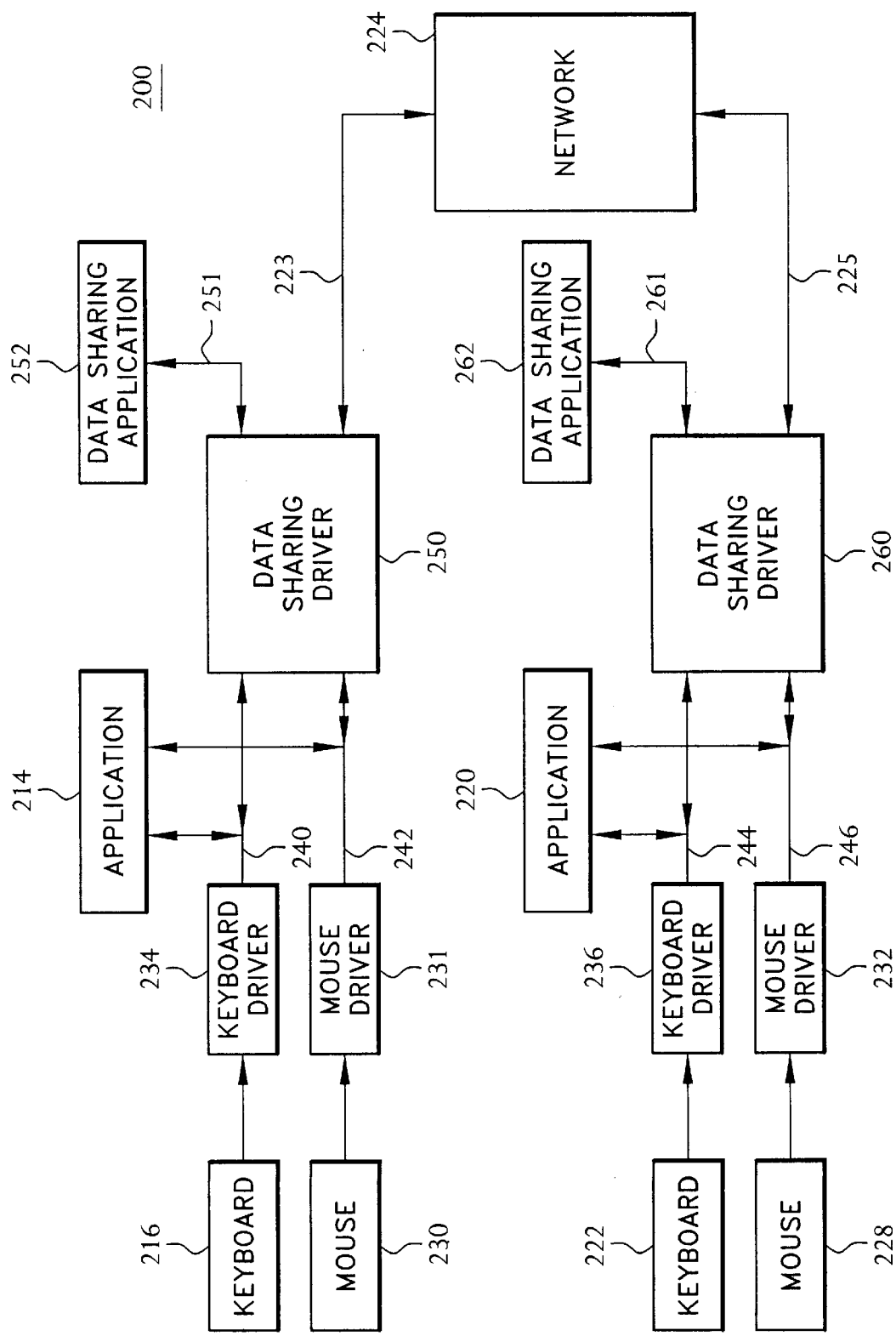
FIG. 2 shows a block diagram representation of a data sharing embodiment which may be implemented on the computer supported collaboration system of FIG. 1.

Referring now to FIG. 2, there is shown a block diagram flow representation of data sharing embodiment 200. Data sharing embodiment 200 may be implemented on the video conferencing system of the present invention using video conferencing network 224. Application program 214 of data sharing embodiment 200 may receive its input both from keyboard 216 and mouse device 230. The inputs from keyboard 216 and mouse device 230 are received and transmitted to application program 214 by way of keyboard driver 234 and mouse driver 231 respectively. Application program 220 may receive its input from both keyboard 222 and mouse device 228. The inputs from keyboard 222 and mouse device 228 are received and transmitted to application program 220 by way of keyboard driver 236 and mouse driver 232 respectively. Drivers 231, 234 apply input data directly to application program 214. Drivers 232, 236 apply input data directly to application program 220.

In a typical configuration of data sharing embodiment 220, keyboards 216, 222 generate interrupts in response to a user depressing keys. In the preferred embodiment keyboard drivers 234, 236 handle these interrupts themselves in order to receive the information from keyboards 216, 222 and apply it to application programs 214, 220. Drivers 231, 234 may be software routines adapted to apply data to application program 214 by way of bidirectional data transmission lines 240, 242. In data conferencing system 200 drivers 231, 234 also apply keyboard data and mouse device data to data sharing driver 250. When data sharing driver 250 receives this data from bidirectional data transmission lines 240, 242, it applies the received data to a remote computer by way of video conferencing network 224.

Similar to the manner described with respect to drivers 231, 234, drivers 232, 236 may be software routines adapted to apply data to an application program such as application program 220. Drivers 232, 236 apply this data to application program 220 by way of bidirectional data transmission lines 244, 246. The data applied to application program 220 is simultaneously applied to data sharing driver 260 by way of data transmission lines 244, 246. Data sharing driver 260 applies the data received by way of transmission lines 244, 246 to video conferencing network 224 for transmission to a remote computer. For example, the data applied to network 224 by drivers 232, 236 may be received by data sharing driver 250 for use and display by application program 214 under the control of data sharing application 252.

Thus, input into either application program 214, 220 is shared with the other application program 214, 220 within data sharing embodiment 200. In order to share data in this manner application program 214 and application program 220 should be the same revision of the same application. Additionally, the screen arrangement for the display of application programs 214, 220 should be exactly the same. For example, when working on a certain cell of a spreadsheet in one application program 214, 220 the screen should be set up the same way in the other application program 214, 220 so that the same cell is modified by movements of mouse devices 228, 230. Even though application programs 214, 220 are operating exactly in parallel in this manner, the fact that they are being shared is completely transparent to their operation and each operates as if the other is not operating.

It is the operation of data sharing applications 252, 262 which permits the data sharing of data sharing embodiment 200. Data sharing applications 252, 262 control data sharing drivers 250, 260, respectively, by way of bidirectional data sharing control lines 251, 261. Under the control of data sharing drivers 250, 260 one application program 214, 220 at a time is the master of embodiment 200. The other application program 214, 220 is thus the slave during that time. During that time the display of the slave is driven by the input of the master. It will be understood that data flows only in one direction at a time through data transmission lines 240, 242, 223, 225, 244, 246 even though they are bidirectional.

In some operations it may not be convenient that application programs 214, 220 of embodiment 200 should be the same revision and that the screens should be set up the same way. However it is these restrictions which make it possible to synchronize application program 214 and application program 220 and to perform the data sharing. When these restrictions can be accommodated an advantageous feature of data sharing embodiment 200 is that application programs 214, 220 may be any existing application programs. Under these circumstances application programs 214, 220 do not have to be rewritten in order to permit data sharing between them within data sharing embodiment 200.

Furthermore, under these circumstances applications 214, 220 may be almost any existing application. In order to achieve this result data sharing applications 252, 262 are adapted to control and synchronize individual application programs 214, 220. This is accomplished by defining the interface between applications programs 214,220 and data sharing drivers 250,260. When application programs 214, 220 transmit data through data sharing applications 252, 262 data sharing drivers 250, 260 are able to direct the keyboard and mouse inputs to the proper locations for the remote application program 214, 220. Data sharing applications are also able to issue commands to the remote application program 214, 220 to force it to conform to the restriction that screen set up and application set up are the same. In this capacity data sharing applications 252, 262 can make sure that both application programs 214, 220 are editing or modifying the same file and working on the same data.

Thus data sharing applications 252, 262 may be tailored for an operating system rather than for each set of application programs 214, 220. In a windowing type of operating system data sharing applications 252, 262 may make system calls to the operating system and the operating system responds in a well defined way. In non-windowed operating systems, it is somewhat more difficult to tailor data sharing applications 252, 262 to the operating system and they would have to be more tuned to the individual application programs 214, 220.

Figure 3:
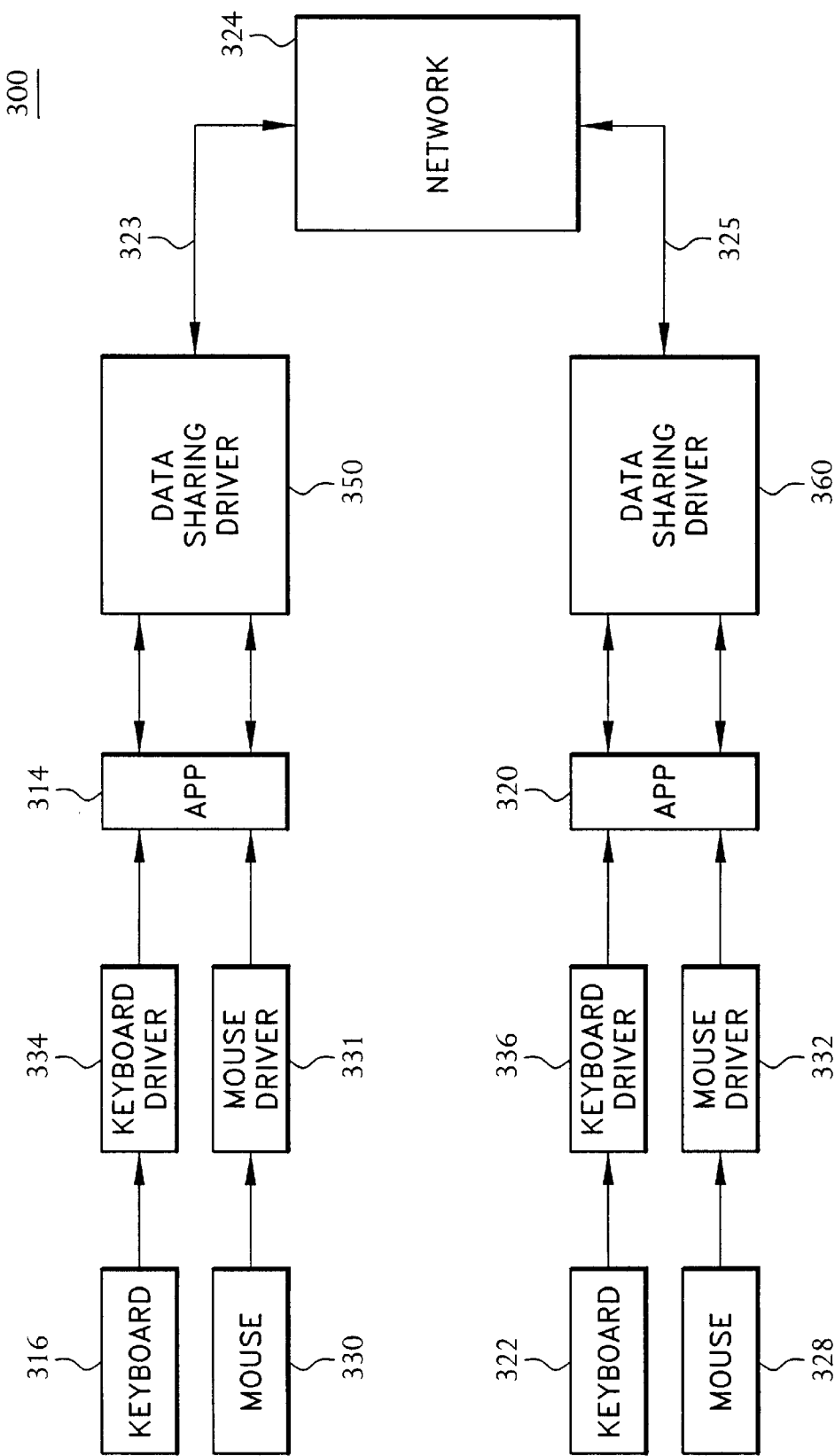
FIG. 3 shows a block diagram representation of an alternate data sharing embodiment which may be implemented on the computer supported collaboration system of FIG. 1.

Referring now to FIG. 3, there is shown a block diagram representation of data sharing embodiment 300. Data sharing embodiment 300 may be implemented in the video conferencing system of the present invention using video conferencing network 324. Video conferencing network 324 couples application programs 314, 320 by way of data sharing drivers 350, 360 and bidirectional data transmission lines 323, 325.

In data sharing embodiment 300 application programs 314, 320 are written such that they are adapted to share data with each other. Thus when application program 314 receives input from mouse device 328 or keyboard 322 of remote application program 320 it is capable of processing it. Thus, in data sharing embodiment 300 both application programs 314, 320 are able to receive and interpret the inputs from their own keyboards 316, 322 and mouse devices 328, 330 as well as the inputs of the remote input devices 316, 322, 328, 330. For example, both application programs 314, 320 of data sharing embodiment 300 are able to determine whether to move an icon to a new location on their own screens and whether to execute a command in response to input from either keyboard 316, 322.

Rather than transmitting raw inputs from mouse devices 328, 330 or keyboards 316, 336 application programs 314, 320 send a set of commands through network 334 to remote application program 314, 320. These are application specific commands.

For example, of application programs 314, 320 are spreadsheet programs and the user of application program 314 highlights a specific cell in the spreadsheet display. Application program 314 transmits a command indicating the cell highlighting through video conferencing network 324 to remote application program 320. This command instructs application program 320 to highlight the corresponding cell on its own display. Application program 314, 320 of data sharing embodiment 300 are not required to be exactly by the same revision as previously set froth with respect to data sharing embodiment 200. Furthermore, application program 314, 320 are not required to provide exactly by the same screen display. Application programs 314, 320 are required, however, to be the same application and the data within application programs 314, 320 must be the same.

Figure 4:
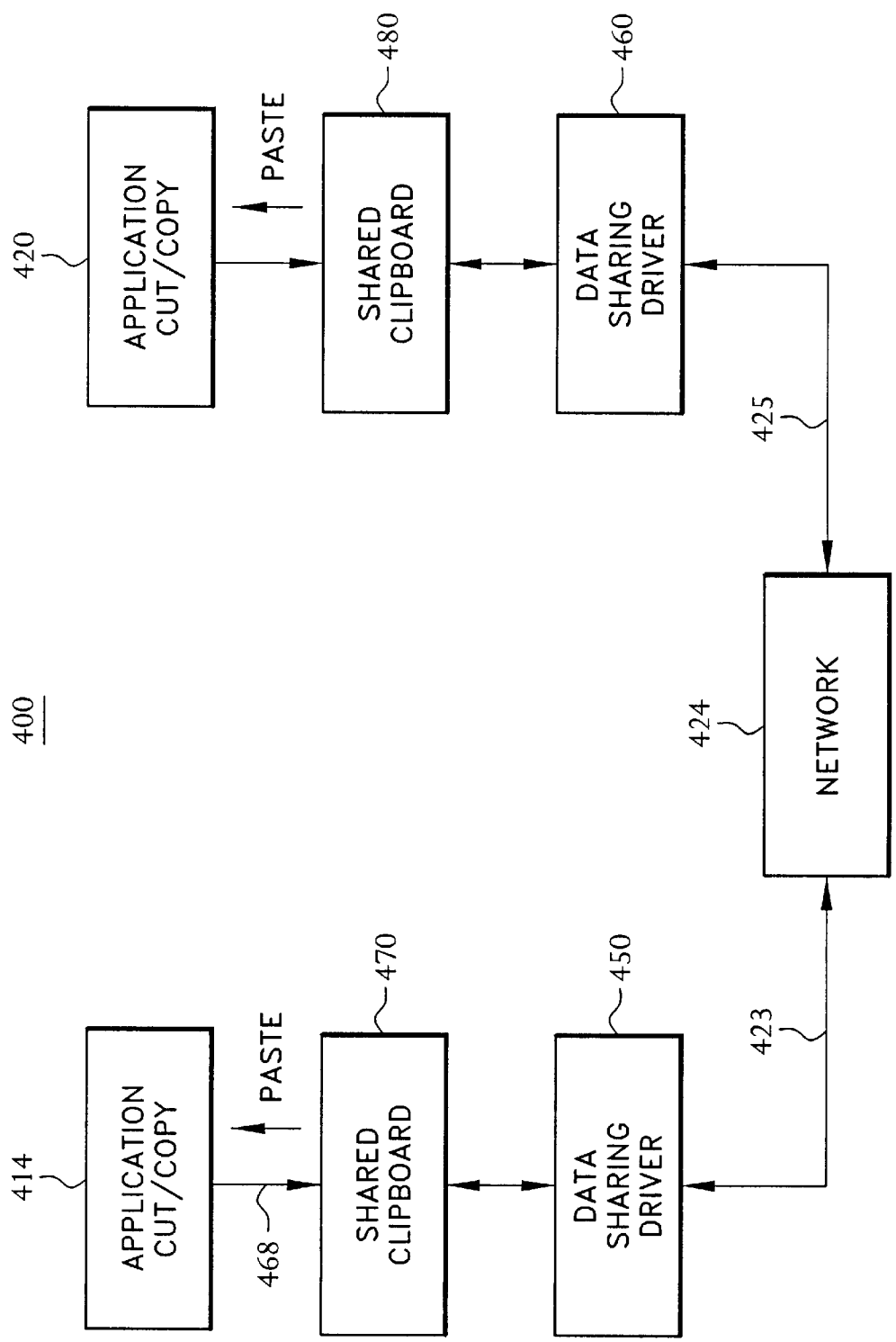
FIG. 4 shows a block diagram representation of a further alternate data sharing embodiment which may be implemented on the computer supported collaboration system of FIG. 1.

Referring now to FIG. 4, there is shown a block diagram representation of data sharing embodiment 400. Data sharing embodiment 400 may be implemented on the video conferencing system of the present invention. Within data sharing embodiment 400 application programs 414, 420 interface with video conferencing network 424 by way of drivers 450, 460. Application programs 414, 420 are designed to adhere to a set of application specific commands which are transmitted by way of video conferencing network 424 within data sharing embodiment 400. Application program 414 may be a spread sheet and application program 420 may could be a document. Alternately application program 414, 420 may be the same application program. For example application program 414, 420 may both be spread sheets or they may both be documents.

Each application program 414, 420 of data sharing embodiment 400 runs its own respective shared clipboard application 470, 480. In this configuration application program 414 may apply data to shared clipboard application 470 by way of line 468 using a cut or copy command. This data is simultaneously transmitted through data sharing driver 450 and video conferencing network 424 to data sharing driver 460, shared clipboard 480 and application program 420. When the transmitted data is received by application program 420 it may appear at shared clipboard 480. When the data appears at shared clipboard 480 the user of application program 420 may issue a paste command. This permits application programs 414, 420 to share information using a cut and a copy as well as a paste on the remote side.

Thus when one application program 414, 420 transmits data by way of video conferencing network 424, the transmitting application 414, 420 performs a cut or copy and the other application program 414, 420 performs a paste operation. When the transmission arrives at the other remote application program 414, 420, it just is dropped unless the receiving application 414, 420 performs the paste operation.

Data sharing embodiment 400 avoids the problems associated with differing revisions of application programs as well as other possible incompatibilities between application programs which may arise within video conferencing system 100. Examples of the possible incompatibilities which may cause problems in other data sharing arrangements may be the way that the display screen is set up, differing drivers, and differing versions of the operating system. Data sharing embodiment 400 thus allows most application programs having cut, copy and paste capabilities to perform the computer supported collaboration of the present invention.

Figure 5:
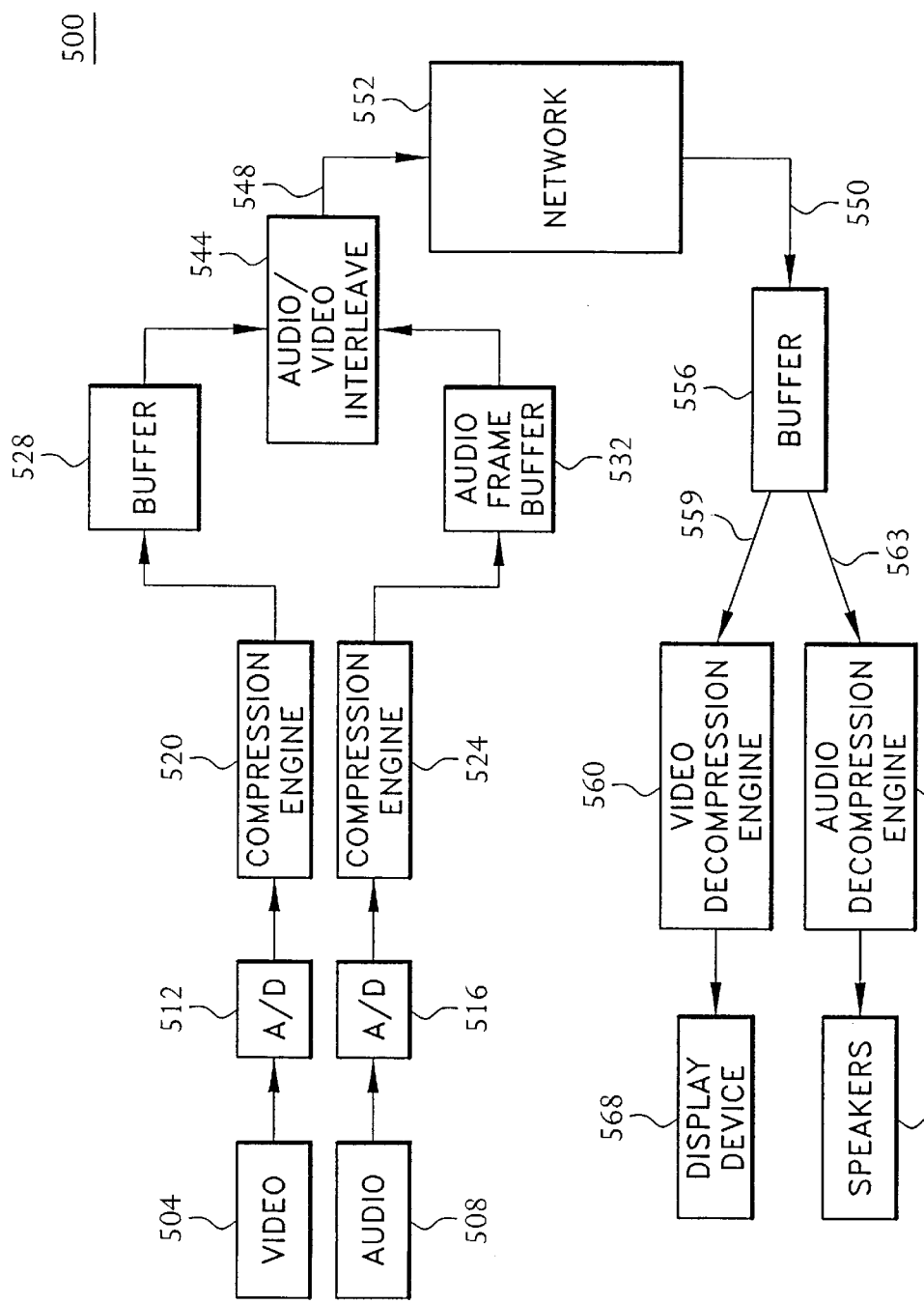
FIG. 5 shows a block diagram of a video conference portion of the computer supported collaboration system of FIG. 1.

Referring now to FIG. 5, there is shown video conferencing embodiment 500. In video conferencing embodiment 500 video data is received by way of video input 504 and audio data is received by way of audio input 508. Data received by inputs 504, 508 is digitized by analog-to-digital converters 512, 516, respectively, to provide digitized video and analog input data streams. The digitized input data streams are applied to a compression engines 520, 524 within video conferencing embodiment 500.

In this manner a video input signal is received at video input 504, converted to digital by analog-to-digital converter 512, and applied to video compression engine 520 and an audio input signal is received at audio input 508, converted to digital by analog-to-digital converter 516, and applied to audio compression engine 524. In order to permit embodiment 500 to provide synchronization of the compressed outputs of compression engines 520, 524, engines 520, 524 generate frames of compressed video and audio, respectively.

The frames of video produced by video compression engine 520 may be thirty frames per second or fewer. The video signal which is thus divided into separate compressed frames by compression engine 520 is applied to video frame buffer 528 one frame at a time. The compressed audio signal is sampled and, according to both the sample frequency of the audio and the number of video frames per second, the compressed audio data is broken up into frames of audio by audio compression engine 524 and applied to audio frame buffer 532.

The video frames of video frame buffer 528 and the audio frames of audio frame buffer 532 are interleaved by video/audio frame interleaving device 544. This process provides synchronization between the compressed video signals and the compressed audio signals. The frame interleaving performed by frame interleaving device 544 is a one-to-one interleaving of a frame of video data with a frame of audio data.

The interleaved frames of data are applied to video conferencing network 552 by way of bidirectional data transmission line 548 and transmitted by video conferencing network 552 to the remote side of the system. It will be understood by those skilled in the art that data transmission within video conferencing embodiment 500 through video conferencing network 524 is bidirectional and that transmission in only one direction is shown in video conferencing embodiment 500 in order to simplify the drawing.

On the receiving side of data sharing embodiment 500 the interleaved audio an, video frames from audio/video frame interleaving device 544 is stored in buffer 556 wherein the interleaving audio and video frames are separated from each other. The separated data streams from buffer 556 are separately applied to video decompression engine 560 by way of line 559 and audio decompression engine 564 by way of line 563. Decompression engines 560, 564 are effective to undo the compression of compression engines 520, 524 on the transmitting side of video conferencing embodiment 500.

The decompressed video data from video decompression engine 560 is applied to display device 568 for visual display within the receiving end of video conferencing embodiment 500. The decompressed audio data from audio decompression engine 564 is applied to transducer devices such as speakers 572 to provide audio reproduction. These receiving and separating operations performed by buffer 566 and the receiving and decompressing operations of decompressing engines 560, 564, acting cooperatively with each other and with the compressing and interleaving operations of compression engines 520, 524, buffers 528, 532 and frame interleaving device 544, are effective to provide synchronization between the signals reproduced on display device 568 and speakers 572.

The computer supported collaboration system of the present invention was implemented using known lab/beta software packages such as those provided by Smart Technologies to incorporate the sharing of application programs and their data in video conferencing using computer supported collaboration. The sharing of application programs in this implementation, as well as the sharing of data in computer supported collaboration in general, may be performed by writing mouse and keyboard drivers for Microsoft (WINDOWS) 3.1 software system to perform the operations of drivers 231, 232, 234, 236 in a manner understood by those skilled in the art. The characteristics of this computer supported collaboration implementation are set forth in Table I.

TABLE I

| | |
|---|---|
| Transfer Rate | 256 k bits/sec (full duplex) |
| Video Algorithm | RTV 2.0 |
| Frame Rate | Up to 12 fps (b/c of inter-frame encoding) |
| Video Data Rate | Variable |
| Delay (one way) | <1 second |
| Spatial Resolution | 128 × 120 |
| Audio Algorithm | ADPCM4E |
| Sample Rate | 8 K samples/sec |
| Audio Data Rate | 32 K bits/sec |

A suitable operating system for providing video conferencing system 100 in this manner may be DOS 5.0. Programs which provide suitable windowing capability are well known in the art. They include, for example, Microsoft (WINDOWS) SKD, (WINDOWS) 3.1 and AVK/ (WINDOWS) 1.1 software systems. A suitable network program for providing, for example, the functions of networks 124, 224, 324, 424, 552 is available from Telsis Inc. Suitable video graphics software for providing the displays of the applications programs of the computer supported collaboration of the present invention include 640×480 VGA mode.

The programming for windows within video conferencing system 100 or computer supported collaboration system 100 in the preferred embodiment is minimal. Application programs 114, 120, 214, 220, 314, 320, 414, 420 may open an all gray window which covers the upper half of their display devices. Two buttons may be created to provide operations previously described. One button may provide a telephone book dialog box and the other may hang up calls in order to terminate a conference. Two black rectangles may be drawn in the window for viewing images as also previously described.

One window may be provided for display of the local user and the other window for display of the remote user. The user may select a name/number from a list of the telephone numbers and either press the CALL button to invoke the call, or press a cancel button. A message loop may be implemented, and if a message is not available, the communications driver is allowed to run. A timer message to this window is enabled at a rate equal to the frame rate. When the window receives this message it determines whether any data is ready to be sent or ready to be decompressed. A driver which may be used for the video/audio compression/ decompression is the Audio Visual Kernal for Windows available from Intel Corporation.

The setup of the audio visual kernal program can be broken up into three parts: the common setup, the playback setup, and the capture setup. In the common setup audio visual kernal starts by opening the audio/video device and registering the video teleconference window with audio visual kernal. This allows audio visual kernal to send messages to the window. A view may be created which maps a 256×240 bitmap onto the 640×480 videos, graphics, audio (VGA) screen. The video data may be displayed in this view and chroma keyed with the VGA display.

In the playback setup the first thing created is a playback group. This playback group allows control of streams that are created in this playback group. This control may include play, pause and flush. These streams are controlled and synchronized as previously described. Group buffer 556 is created to hold the compressed data wherein the compressed data includes both the audio and video data streams interleaved as also previously described. A video stream and an audio stream are created within the playback group buffer and the streams are applied to their respective decompression engines 560, 564. A connector is created which copies and scales the decompressed video data to the view created in the common set up.

In the capture setup a capture group is created. This capture group allows record, pause and flush control of streams that are created in this group. These streams are controlled and synchronized together. Group buffers 528, 532 are created, one for video input signals and one for audio input signals. Group buffers 528, 532 hold the compressed data. The compressed data for audio and video are stored separately in buffers 528, 532 and interleaved in video/audio interleaving device 544.

The input/output for audio visual kernal may be divided into a capture section and a playback section. The capture section is called using a polling mechanism. Captured and compressed data is read into the memory of personal computers 102, 104. This data movement is done for both the audio and video data streams which are already divided into frames. The capture section then combines a single frame of audio with a single frame of video to create a composite or interleaved frame.

The size of the frame is checked with the communications driver to see if it fits in the allocated bandwidth. If the size of the frame is too large, the capture section nulls out the video data. This involves setting the video data to predetermined values. These predetermined values tell the decoder to display the previous frame again. The visual result is a lowering of the frame rate. The composite frame header, video data, and audio data are then sent to the communications driver.

The playback section is invoked by the communications driver when data is available. The playback section reads the data from the communications driver into host memory and then delivers it, as is, to the (ACTION MEDIA) II® card available from Intel Corporation.

What is claimed is:

1. A node for a conferencing system, coupled to at least one other node, providing computer conferencing between the nodes, the node comprising:

means for generating and sending data, video and audio signals to said at least one other node and for receiving and processing data, video and audio signals from said at least one other node; and means for grouping the video and audio signals into video and audio frames, respectively, and for interleaving the video and audio frames on a sequential one-to-one basis before transmission to said at least one other node.

2. The node of claim 1, wherein said nodes are coupled by a network means.

3. The node of claim 1, wherein said data signals are input signals generated by and transmitted directly from one of a keyboard and mouse driver.

4. The node of claim 1, further comprising means for running an applications program for generating applications data signals from input signals generated by and transmitted directly from one of a keyboard and mouse driver, said applications program being configured to share said applications data signals, wherein said applications data signals comprise said data signals.

5. The node of claim 1, further comprising means for storing video and audio signals coupled to said grouping and interleaving means.

6. A method for conferencing using a first computer node coupled to a second computer node, comprising the steps of:

(a) transmitting data, video and audio signals from said first node to said second node;

(b) substantially simultaneously receiving and processing data, video and audio signals at said first node transmitted from said second node; and grouping video and audio signals into video and audio frames, respectively, and interleaving said video and audio frames on a sequential one-to-one basis before transmitting said video and audio signals to said second node.

7. The method of claim 6, further comprising the step of running an applications programs on said first node for generating applications data signals from input signals generated by one of a keyboard or mouse driver, said applications programs being configured to share said applications data signals, said applications data signals comprising said data signals.

8. The method of claim 6, further comprising the step of storing said video and audio signals prior to the step of interleaving.

9. A node for a conferencing system, coupled to at least one other node, providing computer conferencing between the nodes, the node comprising:

a computer device operable to generate and send data, video and audio signals to said at least one other node and to receive and process data, video and audio signals from said at least one other node; and an interlayer operable to group the video and audio signals into video and audio frames, respectively, and to interleave said video and audio frames on a sequential one-to-one basis before transmission to said at least one other node.

10. The node of claim 9, further comprising one of at least a keyboard and mouse coupled to one of a keyboard driver and mouse driver, respectively, for generating raw data signals comprising said data signals and a video and audio input device for generating said video and audio signals.

11. The node of claim 9, wherein said nodes are coupled by a network.

12. The node of claim 9, further comprising an applications program running on said computer device for generating applications data signals from input signals generated by one of a keyboard and mouse driver, said applications program being configured to share said applications data signals, wherein said applications data signals comprise said data signals.

13. The node of claim 9, further comprising memory coupled to said interleaving means operable to store said video and audio signals before interleaving said signals.

14. A video conferencing system providing computer supported collaboration between coupled computers, the video conferencing system comprising:

first and second computer devices having respective first and second data, video and audio signal input means wherein said first and second data, video and audio signal input means are operable to generate, respectively, first and second data, video and audio signals which are received and processed at the other said first or second computer device; and first and second video and audio frame buffers and first and second interleaving means whereby video and audio signals generated at either of said first or second computer devices are grouped into video and audio frames which are interleaved on a sequential one-to-one basis for transfer to the other of said first or second computer device.

15. The system of claim 14, further comprising network means operable to bidirectionally couple said computer devices.

16. The system of claim 9, wherein said first and second applications programs are identical and of the same revision.

17. The system of claim 14, further comprising first and second applications programs running, respectively, on said first and second computer devices, wherein data signals generated at either of said first or second computer devices are shared substantially simultaneously by said first and second applications programs.

18. The system of claim 17, wherein said first and second applications programs generate first and second applications signals from input signals generated by one of a first and second keyboard and mouse driver, said first and second applications programs being configured to share said first and second applications signals, further comprising first and second applications signals sharing means enabling sharing of said applications signals from one of said first or second applications programs with the other of said first or second applications program.

19. The system of claim 18, wherein said first and second applications programs substantially simultaneously operate on a same file using identical applications signals under control of said first and second applications signal sharing means.

20. The system of claim 18, wherein said first and second applications programs are different revisions of a same program.

21. The system of claim 18, wherein said first and second applications programs have cut, copy and paste capabilities and further comprising first and second shared clipboard memory means associated with said first and second computer devices, respectively, wherein applications data signals from one of said first or second applications programs is input to the other of said first or second shared clipboard memory means.

22. The system of claim 21, wherein said input applications data signals from one of said first or second applications programs is pasted into the other of said first or second applications program.

23. The system of claim 21, wherein said first and second applications programs are different.

* * * * *